Feb. 4, 1969　　　O. P. PROCTOR, JR　　　3,426,088
CYCLOHEXANE SEPARATION
Filed Aug. 1, 1966
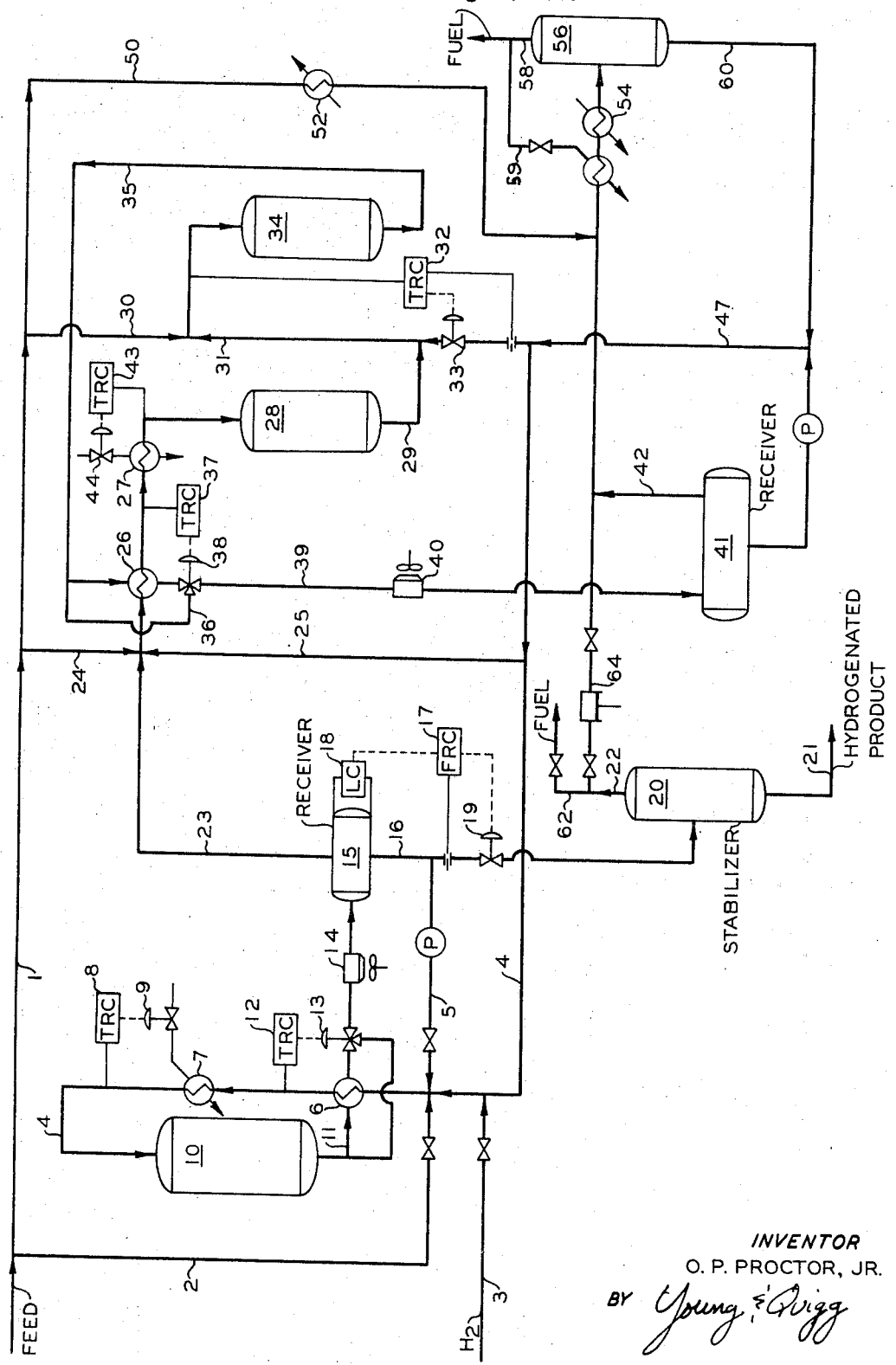
INVENTOR
O. P. PROCTOR, JR.
BY Young & Quigg
ATTORNEYS United States Patent Office 3,426,088
Patented Feb. 4, 1969

3,426,088
CYCLOHEXANE SEPARATION
Oliver P. Proctor, Jr., Bartlesville, Okla., assignor to Phillips Petroleum Company, a corporation of Delaware
Filed Aug. 1, 1966, Ser. No. 569,429
U.S. Cl. 260—666    3 Claims
Int. Cl. C07c 5/10, 7/04

ABSTRACT OF THE DISCLOSURE

In a mixture comprising a crystallizable first component, such as cyclohexane, and a second relatively non-condensable component, for instance, a mixture of hydrogen and light hydrocarbons, the crystallizable component is condensed and separated from the relatively non-condensable component without being crystallized, by means of adding to the mixture a third component, such as benzene, which lowers the freezing point of the crystallizable material thus allowing the condensation separation to take place at a lower temperature and still avoid plugging of lines due to undesired crystal formation. More specifically, a gas stream separated from a first hydrogenation zone effluent containing cyclohexane and non-condensable gases such as hydrogen and light ends is subjected to a condensation type separation to separate the cyclohexane from the non-condensable gas, benzene being added to lower the freezing point of the cyclohexane so as to enable the condensation separation step to be effected at a lower, more efficient temperature.

---

This invention relates to the separation of a crystallizable or solidifiable component from a gas stream. In one of its aspects it relates to the separation of a crystallizable or solidifiable component from a gaseous stream containing the same by adding to said gaseous stream a second component which will lower the crystallization temperature or freezing point of the crystallizable component to such an extent as to allow said crystallizable component to be condensed from the gaseous stream as a liquid at a lower temperature and in greater quantity without crystallizing.

In another of its aspects, the invention relates to the separation of cyclohexane in a gas stream containing the same by adding thereto a small amount of benzene sufficient to reduce the freezing point or crystallization temperature of cyclohexane to such an extent that the cyclohexane can be condensed to a liquid at a lower temperature without crystallizing, resulting in maximum recovery of cyclohexane from the gas stream.

In application Ser. No. 529,054, filed Feb. 21, 1966, there is described and claimed a process and apparatus for hydrogenating benzene to cyclohexane. In said application, hydrogen is fed serially through a plurality of reactors and a benzene feed is added to at least one reactor. The effluent from the last reactor containing some benzene, cyclohexane, and gaseous components, is cooled, and a product stream is condensed and separated from the gaseous components. The gaseous components contain primarily impurities which are present in the hydrogen feed to the reaction zone, the impurities being methane, ethane, and a small amount of reactant hydrogen. Unavoidably, a small portion of the cyclohexane product is present in the gaseous vapor.

It is desirable to remove the cyclohexane product present in the vaporous stream and recover the same. A method of recovering this small amount of cyclohexane would be to further cool the gaseous stream to thereby condense to a liquid a portion of cyclohexane present and separate the liquid cyclohexane from the gaseous components. However, cyclohexane has a crystallization temperature or freezing point of about 6° C. Under normal operating pressures at temperatures below about 6° C., a portion of the cyclohexane would crystallize, i.e., solidify, from the gas stream. Thus, solid cyclohexane would cause plugging of a cooler and condenser in the proposed system for removal of cyclohexane from the gaseous stream.

I have now discovered that the cyclohexane in the gaseous stream can be recovered by adding to the gaseous stream a material which will lower the crystallization temperature of freezing point of cyclohexane to such an extent as to allow the cyclohexane to condense to a liquid even when operating at a temperature below about 6° C. A suitable freezing point depressant for cyclohexane is benzene. Upon cooling and condensing the gas stream containing the crystallization point depressant, cyclohexane can be separated from the gaseous components in conventional simple separation equipment in greater quantities than before without plugging of the equipment due to crystallization of cyclohexane.

By various aspects of this invention, one or more of the following, or other, objects can be obtained.

It is an object of this invention to provide a process for separating a crystallizable component from a gaseous stream in which said crystallizable component can be recovered as a liquid at temperatures at or below which it normally solidifies, preventing plugging of equipment due to the crystallization of said component.

It is a further object of this invention to provide a process for separating cyclohexane from a waste gas stream without crystallization of cyclohexane.

It is a still further object of this invention to provide a process for recovering cyclohexane from a gaseous stream which has been separated from a cooled and condensed benzene hydrogenation effluent process stream.

It is a still further object of this invention to prevent plugging of cooling equipment due to crystallization of cyclohexane in a gaseous stream containing cyclohexane in a process for removing cyclohexane from said gas stream by cooling and condensing the same.

Other aspects, objects, and the several advantages of this invention are apparent to one skilled in the art from a study of this disclosure, the drawing, and the appended claims.

According to the invention, a crystallizable or solidifiable component, such as cyclohexane, is separated from a gas stream containing the same by adding thereto a second component which lowers the crystallization temperature or freezing point of said crystallizable component so that said gas stream can be cooled, said crystallizable component can be condensed to a liquid at a temperature at or below its normal freezing point without solidifying or crystallizing and can be separated from the gaseous products.

In one embodiment, cyclohexane is separated from a waste gas stream by adding a small amount of benzene to said stream.

As used in the specification, the crystallization temperature is that temperature at which a component, such as cyclohexane, will normally become a solid mass. The solid mass can be formed from the gaseous phase or from the liquid phase.

The invention will now be described with reference to the accompanying drawing which shows an embodiment of the invention as applied to hydrogenation of benzene to cyclohexane.

Referring now to the drawing, which will be described with regard to the hydrogenation of benzene to cyclohexane, hydrogen is introduced into the system through line 3. Cyclohexane containing benzene contaminant in line 4 is admixed with an excess of hydrogen in line 3. The admixture is passed through heat exchanger 6 wherein it is heated, through heat exchanger 7 wherein it is further heated, and into reactor 10 which preferably contains a catalyst suitable for initiating the hydrogenation reaction of the trace quantities of benzene to cyclohexane. Normally no benzene or only a small quantity of benzene is added by way of conduit 2. Temperature recorder controller 8 controls the amount of heat supplied to heat exchanger 7 by regulating valve 9 in accordance with the temperature sensed in line 4. The effluent from reactor 10 passes through line 11, heat exchanger 6, cooler 14 which preferably is an air fin cooler, and into receiver 15. Temperature recorder controller 12 controls the amount of heat supplied to line 4 through heat exchanger 6 by regulating valve 13 in accordance with the temperature sensed in line 4 downstream from heat exchanger 6. The conditions in reactor 10 are such that there is present such an excess of hydrogen so that all of the benzene is substantially completely converted to cyclohexane. Thus, the liquid product removed from receiver 15 through line 16 is substantially pure cyclohexane. A portion of this pure cyclohexane can be recycled to the operation through line 5. The other portion of the cyclohexane product passes through line 16 to stabilizer 20 wherein pure cyclohexane product, removed from stabilizer 20 through line 21, is separated from impurities which leave the stabilizer through line 22. The flow of product through line 16 is regulated by flow recorder controller 17 which operates valve 19 in accordance with the liquid level sensed by liquid level sensor 18 in receiver 15. Non-condensable gases in receiver 15, the gases consisting primarily of hydrogen and methane, are passed through line 23 into admixture with benzene in line 24, and recycle product comprising cyclohexane contaminated with benzene through line 25. The mixture is heated in heat exchanger 26, heat exchanger 27 and passed to reactor 28 in which benzene is catalytically hydrogenated to cyclohexane. Reactor 28 can be similar to reactor 10, however, due to the nature of the process, reactor 10 need not be as large as reactor 28. The effluent from reactor 28 passes through line 29 into admixture with more benzene feed through line 30 and more recycle product comprising cyclohexane contaminated with benzene through line 31. The admixture then passes to reactor 34 wherein substantially all of the hydrogen in the feed is used up in converting the benzene to cyclohexane.

The heating of feed downstream from heat exchanger 27 is controlled by temperature recorder controller 43 which adjusts valve 44 responsive to the temperature sensed in the feed line downstream from the heat exchanger 27. Similarly, the heating in heat exchanger 26 can be controlled by temperature recorder controller 37 which adjusts valve 38 to by-pass more or less liquid through line 36 according to temperature sensed in the feed line between heat exchanger 26 and heat exchanger 27.

The effluent from reactor 34 containing primarily cyclohexane and benzene contaminant, along with some non-condensable gases such as methane along with some hydrogen, is passed through line 35 and cooled in heat exchanger 26, through line 39, air fin cooler 40 and receiver 41. Due to the nature of the process, since no hydrogen need be recycled, an air fin cooler is suitable for cooling the effluent in line 35. The non-condensable gases can be removed from the system through line 42, whereas the liquid product containing cyclohexane and contaminating benzene is recycled through line 47 to reactors 10, 28 and 34.

According to the invention, non-condensable gases in line 42, containing a small portion of cyclohexane product, are admixed with a small portion of benzene which is passed through line 50 and can be heated in heat exchanger 52 to vaporize the same. The combined streams are then cooled in heat exchanger 54 and passed to separator 56 in which a condensed stream, containing benzene and cyclohexane, is removed through line 60 and admixed with product in stream 47. Non-condensable gases, such as hydrogen, methane, and ethane, are removed through line 58 and can be used as a suitable fuel. The fuel in line 58 can be passed through line 59 into heat exchange with the hotter products in line 64 since some cooling of products takes place in separator 56.

The cooling in heat exchanger 54 is sufficient to condense the benzene and cyclohexane in line 42. Benzene forms a eutectic with cyclohexane, which eutectic has a crystallization temperature of $-43.7°$ C. Thus, the crystallization point of cyclohexane can be depressed as far as $-43.7°$ C. with the addition of benzene to the gaseous stream. And at this much lower temperature, additional cyclohexane product can be recovered from the gaseous stream.

Still further according to the invention, the impurities in line 22 removed overhead from stabilizer 20, comprise light hydrocarbon products such as methane and ethane along with an equilibrium amount of cyclohexane product. These impurities, containing a small percentage of cyclohexane in the gaseous stream, can be removed as a fuel through line 62 or can be compressed, passed through line 64 and admixed with the non-condensable gases in line 42 for removal of the cyclohexane in separator 56.

EXAMPLE

| Stream component | Hydrogen | Methane | Benzene | Cyclohexane | Total (No. mols per unit of time) |
|---|---|---|---|---|---|
| (1) Total benzene | | | 276.77 | | 276.77 |
| To reactor (28): | | | | | |
| (24) Benzene feed | | | 152.22 | | 152.22 |
| (25) CyC$_6$ recycle | 1.89 | 49.55 | (¹) | 1313.05 | 1364.49 |
| (23) H$_2$ feed | 911.35 | 371.07 | | 61.70 | 1344.12 |
| To reactor (34): | | | | | |
| (29) Effluent | 456.58 | 420.62 | | 1526.97 | 2404.17 |
| (30) Benzene feed | | | 124.55 | | 124.55 |
| (47) CyC$_6$ recycle | 0.50 | 13.08 | (¹) | 346.47 | 360.05 |
| (35) Effluent | 83.43 | 433.70 | | 1997.99 | 2515.12 |
| To reactor (10): | | | | | |
| (2) Benzene feed | | | | | (⁴) |
| (4) CyC$_6$ recycle | 0.48 | 12.63 | (¹) | 334.93 | 348.04 |
| (3) Hydrogen | 913.34 | 362.81 | | | 1276.15 |
| (21) CyC$_6$ product | | 0.36 | | 273.04 | ² 273.40 |
| (22) Stab OHD | 2.47 | 4.01 | | 0.19 | 6.67 |
| (42) Off-gas | 80.56 | 358.44 | | 3.54 | ³ 442.54 |
| (50) Benzene diluent | | | 1.13 | | 1.13 |
| (58) Fuel Gas ⁵ | 80.56 | 358.44 | 0.07 | 0.14 | 439.21 |
| (60) Liquid Recovery ⁷ | | | 1.06 | 3.40 | ⁶ 4.46 |

¹ Trace.
² 99.86 percent cyclohexane purity.
³ 18.2 percent hydrogen purity.
⁴ Normally none or small flow.
⁵ Operation with all of gas 22 going to fuel 62 and cooling the gas 42 to $-40°$ C. at 200 p.s.i.g.
⁶ A net of 3.33 mols per unit time of cyclohexane is recovered (3.54 CyC$_6$—0.07 benzene—0.14 CyC$_6$=3.33 mols).
⁷ This stream is not included in the rest of the material balance for sake of simplicity.

Whereas the process has been described with regard to three reactors, it is obvious that two reactors could also be used in carrying out the process. In a two reactor process, reactors 28 and 34 would be combined, thus eliminating line 29. Further, it is within the scope of the invention to include more than three reactors or reaction zones in carrying out the invention. Thus, more reactors such as reactor 34 could be added onto the process as hereinbefore described.

Whereas the invention has been described with reference to the hydrogenation of benzene to cyclohexane, it is obvious that the invention can be applied to other systems wherein it is desirable to separate a crystallizable component from a gaseous stream containing the same. However, as pointed out above, the invention is particularly suitable for removing cyclohexane from a gaseous stream separated from a hydrogenation effluent in which benzene is hydrogenated to cylohexane.

Reasonable variation and modification are possible within the scope of the foregoing disclosure, the drawing, and the claims to the invention without departing from the spirit and scope thereof.

I claim:

1. A process for separating cyclohexane, crystallizable at a desired condensation temperature and pressure, from a second component, relatively non-condensable at ordinary temperatures and pressure, said cyclohexane being in the gaseous phase in said second component, said process comprising: adding to the mixture of said cyclohexane and said second component, benzene which in proper amounts lowers the crystallization temperature of said cyclohexane, said benzene being added in a sufficient amount to allow condensation of said cyclohexane without crystallization; cooling said combined streams to condense said cyclohexane and thus separate said cyclohexane from said second component; and recovering said cyclohexane.

2. A process according to claim 1 wherein the mixture of said cyclohexane and second component is a gas stream separated from a first hydrogenation zone effluent in which benzene is hydrogenated cyclohexane, the gas stream being separated after the effluent has been cooled and condensed, and said second component is a non-condensable gas stream containing hydrogen and light ends.

3. A process according to claim 2 wherein the product stream resulting from the separation of said gas stream from said first hydrogenation zone effluent is passed to a second hydrogenation zone and therein contacted with hydrogen to hydrogenate substantially all of the benzene to cyclohexane, the effluent from said second hydrogenation zone is separated to recover unused hydrogen and other non-condensable gases from the product containing substantially only cyclohexane having dissolved therein light ends, separated cyclohexane is passed to a stabilizer wherein substantially pure cyclohexane product is separated from said light ends, a second gaseous stream containing light ends and unavoidably some cyclohexane entrained therein is removed from said stabilizer and passed into admixture with said first gaseous stream.

References Cited

UNITED STATES PATENTS

| | | | |
|---|---|---|---|
| 2,833,698 | 5/1958 | Patton et al. | 196—28 |
| 3,254,134 | 5/1968 | Smith et al. | 260—667 |
| 3,341,613 | 9/1967 | Hann | 260—667 |
| 2,765,921 | 10/1956 | Green | 260—666 |
| 2,816,938 | 12/1957 | Hess | 260—666 |
| 2,848,507 | 8/1958 | Bennett | 260—666 |
| 2,794,840 | 6/1957 | Vela | 260—666 |
| 2,913,503 | 11/1959 | Bozich et al. | 260—666 |
| 3,318,965 | 5/1967 | Hutto et al. | 260—667 |

DELBERT E. GANTZ, *Primary Examiner.*

V. O'KEEFE, *Assistant Examiner.*

U.S. Cl. X.R.

260—667